(12) United States Patent
McCune (10) Patent No.: US 11,970,982 B2
(45) Date of Patent: *Apr. 30, 2024

(54) TURBINE ENGINE GEARBOX (71) Applicant: RTX CORPORATION, Farmington, CT (US)

(72) Inventor: Michael E. McCune, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,247

(22) Filed: Nov. 15, 2022

(65) Prior Publication Data

US 2023/0109261 A1   Apr. 6, 2023

Related U.S. Application Data

(63) Continuation of application No. 17/023,860, filed on Sep. 17, 2020, now Pat. No. 11,525,406, which is a
(Continued)

(51) Int. Cl.
*F02C 7/36* (2006.01)
*F01D 15/12* (2006.01)
(Continued)

(52) U.S. Cl.
CPC ............ *F02C 7/36* (2013.01); *F01D 15/12* (2013.01); *F02K 3/04* (2013.01); *F02K 3/072* (2013.01);
(Continued)

(58) Field of Classification Search
CPC .. F02C 7/36; F02C 3/107; F05D 2260/40311; F01D 15/12; F02K 3/04; F02K 3/06;
(Continued)

(56) References Cited

U.S. PATENT DOCUMENTS 2,067,477 A   1/1937   Cooper
2,258,792 A   10/1941  New
(Continued)

FOREIGN PATENT DOCUMENTS

EP   0791383 A1   8/1997
EP   1142850 A1   10/2001
(Continued)

OTHER PUBLICATIONS

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
(Continued)

*Primary Examiner* — Loren C Edwards
(74) *Attorney, Agent, or Firm* — Carlson, Gaskey & Olds, P.C.

(57) ABSTRACT

A gas turbine engine according to an example of the present disclosure includes, among other things, a propulsor section including a propulsor, a gear reduction, a first spool including a first compressor, a first turbine and a first shaft, and a second spool including a second compressor, a second turbine and a second shaft. The gear reduction includes a carrier and a plurality of gears. The plurality of gears include a sun gear, a ring gear, and a plurality of intermediate gears that engage the sun gear and the ring gear. At least two of the plurality of gears are double helical gears in meshed engagement.

33 Claims, 5 Drawing Sheets

Related U.S. Application Data continuation of application No. 15/943,812, filed on Apr. 3, 2018, now Pat. No. 10,781,755, which is a continuation of application No. 14/940,632, filed on Nov. 13, 2015, now abandoned, which is a continuation of application No. 14/470,982, filed on Aug. 28, 2014, now Pat. No. 9,222,416, which is a continuation of application No. 14/174,878, filed on Feb. 7, 2014, now Pat. No. 9,169,781, which is a continuation-in-part of application No. 13/438,245, filed on Apr. 3, 2012, now Pat. No. 8,720,306.

(60) Provisional application No. 61/592,964, filed on Jan. 31, 2012.

(51) Int. Cl.
F02K 3/04 (2006.01)
F02K 3/072 (2006.01)
F16H 1/28 (2006.01)
F16H 1/46 (2006.01)
F16H 57/00 (2012.01)

(52) U.S. Cl.
CPC ............. *F16H 1/28* (2013.01); *F16H 1/46* (2013.01); *F16H 57/0006* (2013.01); *F05D 2260/40311* (2013.01); *Y02T 50/60* (2013.01)

(58) Field of Classification Search
CPC ... F02K 3/072; F16H 1/08; F16H 1/18; F16H 1/28; F16H 1/46; F16H 3/06; F16H 57/0006; Y02T 50/60
See application file for complete search history.

(56) References Cited

U.S. PATENT DOCUMENTS

| | | |
|---|---|---|
| 2,684,591 A | 7/1954 | Lundquist |
| 2,734,396 A | 2/1956 | Falk et al. |
| 2,823,558 A | 2/1958 | Semar et al. |
| 2,936,655 A | 5/1960 | Peterson et al. |
| 3,021,731 A | 2/1962 | Stoeckicht |
| 3,160,026 A | 12/1964 | William et al. |
| 3,194,487 A | 7/1965 | Tyler et al. |
| 3,287,906 A | 11/1966 | Mccormick |
| 3,352,178 A | 11/1967 | Lindgren et al. |
| 3,412,560 A | 11/1968 | Gaubatz |
| 3,664,612 A | 5/1972 | Skidmore et al. |
| 3,682,015 A | 8/1972 | Richardson |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark et al. |
| 3,843,277 A | 10/1974 | Ehrich |
| 3,892,358 A | 7/1975 | Gisslen |
| 3,932,058 A | 1/1976 | Harner et al. |
| 3,935,558 A | 1/1976 | Miller et al. |
| 3,969,956 A | 7/1976 | Hanslik |
| 3,988,889 A | 11/1976 | Chamay et al. |
| 4,130,872 A | 12/1978 | Haloff |
| 4,220,171 A | 9/1980 | Ruehr et al. |
| 4,240,250 A | 12/1980 | Harris |
| 4,284,174 A | 8/1981 | Salvana et al. |
| 4,289,360 A | 9/1981 | Zirin |
| 4,478,551 A | 10/1984 | Honeycutt, Jr. et al. |
| 4,583,413 A | 4/1986 | Lack |
| 4,612,816 A | 9/1986 | Chalik |
| 4,641,543 A | 2/1987 | Jessup |
| 4,649,114 A | 3/1987 | Miltenburger et al. |
| 4,651,521 A * | 3/1987 | Ossi .............. F02C 3/113 60/226.3 |
| 4,696,156 A | 9/1987 | Burr et al. |
| 4,722,357 A | 2/1988 | Wynosky |
| 4,979,362 A | 12/1990 | Vershure, Jr. |
| 5,058,617 A | 10/1991 | Stockman et al. |
| 5,102,379 A | 4/1992 | Pagluica et al. |
| 5,141,400 A | 8/1992 | Murphy et al. |
| 5,211,541 A | 5/1993 | Fledderjohn et al. |
| 5,317,877 A | 6/1994 | Stuart |
| 5,361,580 A | 11/1994 | Ciokajlo et al. |
| 5,415,595 A | 5/1995 | Nelson |
| 5,433,674 A | 7/1995 | Sheridan et al. |
| 5,447,411 A | 9/1995 | Curley et al. |
| 5,466,198 A * | 11/1995 | McKibbin .............. F02C 7/36 475/346 |
| 5,472,383 A | 12/1995 | McKibbin |
| 5,485,761 A | 1/1996 | Rouverol |
| 5,524,847 A | 6/1996 | Brodell et al. |
| 5,528,960 A | 6/1996 | Nagao et al. |
| 5,634,767 A | 6/1997 | Dawson |
| 5,677,060 A | 10/1997 | Terentieva et al. |
| 5,778,659 A | 7/1998 | Duesler et al. |
| 5,815,922 A | 10/1998 | Sato |
| 5,842,946 A | 12/1998 | Ichiki |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,117,036 A | 9/2000 | Lanzon et al. |
| 6,122,985 A | 9/2000 | Altamura |
| 6,183,388 B1 | 2/2001 | Hawkins |
| 6,223,616 B1 | 5/2001 | Sheridan |
| 6,264,138 B1 | 7/2001 | Hawkins |
| 6,302,356 B1 | 10/2001 | Hawkins |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,402,654 B1 | 6/2002 | Lanzon et al. |
| 6,517,341 B1 | 2/2003 | Brun et al. |
| 6,607,165 B1 | 8/2003 | Manteiga et al. |
| 6,622,473 B2 | 9/2003 | Becquerelle et al. |
| 6,666,102 B2 | 12/2003 | Gmirya et al. |
| 6,709,492 B1 | 3/2004 | Spadaccini et al. |
| 6,732,502 B2 | 5/2004 | Seda et al. |
| 6,814,541 B2 | 11/2004 | Evans et al. |
| 6,832,973 B1 | 12/2004 | Welsh |
| 6,883,303 B1 | 4/2005 | Seda |
| 6,886,325 B2 | 5/2005 | Norris et al. |
| 6,986,726 B2 | 1/2006 | Simon |
| 7,021,042 B2 | 4/2006 | Law |
| 7,219,490 B2 | 5/2007 | Dev |
| 7,328,580 B2 | 2/2008 | Lee et al. |
| 7,374,403 B2 | 5/2008 | Decker et al. |
| 7,591,754 B2 | 9/2009 | Duong et al. |
| 7,632,064 B2 | 12/2009 | Somanath et al. |
| 7,662,059 B2 | 2/2010 | McCune |
| 7,694,505 B2 | 4/2010 | Schilling |
| 7,704,178 B2 | 4/2010 | Sheridan et al. |
| 7,806,651 B2 | 10/2010 | Kennepohl et al. |
| 7,824,305 B2 | 11/2010 | Duong et al. |
| 7,828,682 B2 | 11/2010 | Smook |
| 7,926,260 B2 | 4/2011 | Sheridan et al. |
| 7,963,190 B2 | 6/2011 | Sullivan et al. |
| 7,997,868 B1 | 8/2011 | Liang |
| 8,015,900 B2 | 9/2011 | Gmirya |
| 8,047,505 B2 | 11/2011 | Biester |
| 8,205,432 B2 | 6/2012 | Sheridan |
| 8,231,503 B2 | 7/2012 | Buelna |
| 11,525,406 B2 * | 12/2022 | McCune .............. F02K 3/072 |
| 2005/0081668 A1 | 4/2005 | Hagihara |
| 2005/0192151 A1 | 9/2005 | Simon |
| 2006/0228206 A1 | 10/2006 | Decker et al. |
| 2008/0003096 A1 | 1/2008 | Kohli et al. |
| 2008/0006018 A1 | 1/2008 | Sheridan et al. |
| 2008/0044276 A1 | 2/2008 | McCune et al. |
| 2008/0116009 A1 | 5/2008 | Sheridan et al. |
| 2008/0163606 A1 * | 7/2008 | Cini .............. F02K 1/10 60/226.3 |
| 2008/0317588 A1 | 12/2008 | Grabowski et al. |
| 2009/0056343 A1 | 3/2009 | Suciu et al. |
| 2009/0062058 A1 | 3/2009 | Kimes et al. |
| 2009/0090096 A1 | 4/2009 | Sheridan |
| 2009/0227415 A1 | 9/2009 | Buelna |

(56) References Cited

U.S. PATENT DOCUMENTS

| | | |
|---|---|---|
| 2009/0277299 A1 | 11/2009 | Gmirya |
| 2009/0293278 A1 | 12/2009 | Duong et al. |
| 2009/0298640 A1 | 12/2009 | Duong et al. |
| 2009/0304518 A1 | 12/2009 | Kodama et al. |
| 2009/0314881 A1 | 12/2009 | Suciu et al. |
| 2010/0105270 A1 | 4/2010 | Peng et al. |
| 2010/0105516 A1 | 4/2010 | Sheridan et al. |
| 2010/0148396 A1 | 6/2010 | Xie et al. |
| 2010/0212281 A1 | 8/2010 | Sheridan |
| 2010/0218483 A1 | 9/2010 | Smith |
| 2010/0331139 A1 | 12/2010 | McCune |
| 2011/0092331 A1 | 4/2011 | Haughom |
| 2011/0105270 A1 | 5/2011 | Matsuoka et al. |
| 2011/0124461 A1 | 5/2011 | Torii et al. |
| 2011/0143880 A1 | 6/2011 | Minadeo et al. |
| 2011/0159797 A1 | 6/2011 | Beltman et al. |
| 2011/0206498 A1 | 8/2011 | McCooey |
| 2011/0293423 A1 | 12/2011 | Bunker et al. |
| 2012/0071288 A1 | 3/2012 | Dalenberg et al. |
| 2012/0124964 A1 | 5/2012 | Hasel et al. |
| 2012/0189430 A1 | 7/2012 | McCune et al. |

FOREIGN PATENT DOCUMENTS

| | | |
|---|---|---|
| EP | 0896922 B1 | 1/2004 |
| EP | 1876338 A2 | 1/2008 |
| EP | 2241780 A2 | 10/2010 |
| EP | 2327859 A2 | 6/2011 |
| FR | 938032 A | 9/1948 |
| FR | 1357038 A | 4/1964 |
| FR | 2742834 A1 | 6/1997 |
| GB | 111329 A | 11/1917 |
| GB | 364719 A | 1/1932 |
| GB | 1516041 A | 6/1978 |
| GB | 2041090 A | 9/1980 |
| GB | 2426792 A | 12/2006 |
| JP | S46036927 | 10/1971 |
| JP | H05248267 A | 9/1993 |
| JP | H09317833 A | 12/1997 |
| JP | 2001208146 A | 8/2001 |
| JP | 3920031 B2 | 5/2007 |
| WO | 0208055 A1 | 1/2002 |
| WO | 2007038674 A1 | 4/2007 |
| WO | 2012010165 A2 | 1/2012 |

OTHER PUBLICATIONS

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

"Helical Gears, Double Helical Gears," DixiTech CNC, [Retrieved on Mar. 30, 2012], Retrieved from the Internet: URL: http://www.dixitechcnc.com/helical_gear.html.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.

Hendricks, E.S. and Tong, M.T. (2012). Performance and weight estimates for an advanced open rotor engine. NASA/TM-2012-217710. pp. 1-13.

Hess, C. (1998). Pratt & Whitney develops geared turbofan. Flug Revue 43(7). Oct. 1998.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Holcombe, V. (2003). Aero-Propulsion Technology (APT) task V low noise ADP engine definition study. NASA CR-2003-212521. Oct. 1, 2003. pp. 1-73.

Honeywell Learjet 31 and 35/36 TFE731-2 to 2C Engine Upgrade Program. Sep. 2005. pp. 1-4.

Honeywell LF502. Jane's Aero-engines, Aero-engines—Turbofan. Feb. 9, 2012.

Honeywell LF502. Jane's Aero-engines, Aero-engines—Turbofan. Aug. 17, 2016.

Honeywell LF507. Jane's Aero-engines, Aero-engines—Turbofan. Feb. 9, 2012.

Honeywell Sabreliner 65 TFE731-3 to -3D Engine Upgrade Program. Oct. 2005. pp. 1-4.

Honeywell TFE731. Jane's Aero-engines, Aero-engines—Turbofan. Jul. 18, 2012.

Honeywell TFE731 Pilot Tips. pp. 1-143.

Honeywell TFE731-5AR to -5BR Engine Conversion Program. Sep. 2005. pp. 1-4.

Horikoshi, S. and Serpone, N. (2013). Introduction to nanoparticles. Microwaves in nanoparticle synthesis. Wiley-VCH Verlag GmbH & Co. KGaA. pp. 1-24.

Howard, D.F. (1976). QCSEE preliminary under the wing flight propulsion system analysis report. NASA CR-134868. Feb. 1, 1976. pp. 1-260.

Howe, D.C. and Wynosky, T.A. (1985). Energy efficient engine program advanced turbofan nacelle definition study. NASA CR-174942. May 1, 1985. pp. 174.

Howe, D.C., and Wynosky, T.A. (1985). Energy efficient engine program advanced turbofan nacelle definition study. NASA-CR-174942. May 1985. pp. 1-60.

Howe, D.C., and Wynosky, T.A. (1985). Energy efficient engine program advanced turbofan nacelle definition study. NASA-CR-174942. May 1985. University of Washington dated Dec. 13, 1990. pp. 1-14.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Hughes, C. (2002). Aerodynamic performance of scale-model turbofan outlet guide vanes designed for low noise. Prepared for the 40th Aerospace Sciences Meeting and Exhibit. Reno, Nv. NASA/TM-2001-211352. Jan. 14-17, 2002. pp. 1-38.

Hughes, C. (2010). Geared turbofan technology. NASA Environmentally Responsible Aviation Project. Green Aviation Summit. NASA Ames Research Center. Sep. 8-9, 2010. pp. 1-8.

International Preliminary Report on Patentability for PCT Application No. PCT/US2013/023356, dated Aug. 14, 2014, 10 pages.

International Search Report and Written Opinion for PCT Application No. PCT/US2013/023356 dated Oct. 22, 2013.

Ivchenko-Progress AI-727M. Jane's Aero-engines, Aero-engines—Turbofan. Nov. 27, 2011.

Ivchenko-Progress D-436. Jane's Aero-engines, Aero-engines—Turbofan. Feb. 8, 2012.

Ivchenko-Progress D-727. Jane's Aero-engines, Aero-engines—Turbofan. Feb. 7, 2007.

Jacobson, N.S. (1993). Corrosion of silicon-based ceramics in combustion environments. J. Am. Ceram. Soc. 76(1). pp. 3-28.

Japanese Office Action for JP2007-202444 dated Aug. 3, 2010.

Jeng, Y.-L., Lavernia, E.J. (1994). Processing of molybdenum disilicide. J. of Mat. Sci. vol. 29. 1994. pp. 2557-2571.

Johnston, R.P. and Hemsworth, M.C. (1978). Energy efficient engine preliminary design and integration studies. Jun. 1, 1978. pp. 1-28.

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.

Jorgensen, P.J., Wadsworth, M.E., and Cutler, I.B. (1961). Effects of water vapor on oxidation of silicon carbide. J. Am. Ceram. Soc. 44(6). pp. 248-261.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Kandebo, S.W. (1998). Geared-Turbofan engine design targets cost, complexity. Aviation Week & Space Technology, 148(8). p. 34-5.

Kandebo, S.W. (1998). Pratt & Whitney launches geared turbofan engine. Aviation Week & Space Technology, 148(8). p. 32-4.

(56) References Cited

OTHER PUBLICATIONS

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kerrebrock, J.L. (1977). Aircraft engines and gas turbines. Cambridge, MA: The MIT Press. p. 11.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Krantz, T.L. (1990). Experimental and analytical evaluation of efficiency of helicopter planetary stage. NASA Technical Paper. Nov. 1990. pp. 1-19.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.
Kurzke, J. (2012). GasTurb 12: Design and off-design performance of gas turbines. Retrieved from: https://www.scribd.com/document/153900429/GasTurb-12.
2003 NASA seal/secondary air system workshop. (2003). NASA/CP-2004-212963/vol. 1. Sep. 1, 2004. pp. 1-408.
About GasTurb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley & Sons, Inc. New York: New York. pp. 1-11, 13-23, 26-33, 50-1, 56-8, 60-1, 64-71, 87-9, 324-9, 436-7.
AGMA Standard (1997). Design and selection of components for enclosed gear drives. lexandria, VA: American Gear Manufacturers Association. pp. 1-48.
AGMA Standard (1999). Flexible couplings—Mass elastic properties and other characteristics. Alexandria, VA: American Gear Manufacturers Association. pp. 1-46.
AGMA Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Avco Lycoming Divison. ALF 502L Maintenance Manual. Apr. 1981. pp. 1-118.
Aviadvigatel D-110. Jane's Aero-engines, Aero-engines—Turbofan. Jun. 1, 2010.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Berton, J.J. and Guynn, M.D. (2012). Multi-objective optimization of a turbofan for an advanced, single-aisle transport. NASA/TM-2012-217428. pp. 1-26.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing engine acoustic data. NASA-TM-82691. May 1, 1982. pp. 1-28.
Bloomer, H.E. and Samanich, N.E. (1982). QCSEE under-the-wing enging-wing-flap aerodynamic profile characteristics. NASA-TM-82890. Sep. 1, 1982. pp. 1-48.
Bloomer, H.E., Loeffler, I.J., Kreim, W.J., and Coats, J.W. (1981). Comparison of NASA and contractor resits from aeroacoustic tests of QCSEE OTW engine. NASA Technical Memorandum 81761. Apr. 1, 1981. pp. 1-30.
Bornstein, N. (1993). Oxidation of advanced intermetallic compounds. Journal de Physique IV, 1993, 03 (C9), pp. C9-367-C9-373.
Brennan, P.J. and Kroliczek, E.J. (1979). Heat pipe design handbook. Prepared for National Aeronautics and Space Administration by B & K Engineering, Inc. Jun. 1979. pp. 1-348.
Brines, G.L. (1990). The turbofan of tomorrow. Mechanical Engineering: The Journal of the American Society of Mechanical Engineers, 108(8), 65-67.
Bucknell, R.L. (1973). Influence of fuels and lubricants on turbine engine design and performance, fuel and lubircant analyses. Final Technical Report, Mar. 1971-Mar. 1973. pp. 1-252.
Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference. pp. 1-10.
Chapman J.W., et al., "Control Design for an Advanced Geared Turbofan Engine", AIAA Joint Propulsion Conference 2017, Jul. 10, 2017- Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Clarke, D.R. and Levi, C.G. (2003). Materials design for the next generation thermal barrier coatings. Annual. Rev. Mater. Res. vol. 33. 2003. pp. 383-417.
Cramoisi, G. Ed. (2012). Death in the Potomac: The crash of Air Florida Flight 90. Air Crash Investigations. Accident Report NTSB/AAR-82-8. p. 45-47.
Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.
Daggett, D.L., Brown, S.T., and Kawai, R.T. (2003). Ultra-efficient engine diameter study. NASA/CR-2003-212309. May 2003. pp. 1-52.
Dalton, III., W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-12.

(56) References Cited

OTHER PUBLICATIONS

Daly, M. Ed. (2010). Jane's Aero-Engine. Issue Twenty-seven. Mar. 2010. p. 633-636.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.

Darrah, S. (1987). Jet fuel deoxygenation. Interim Report for Period Mar. 1987-Jul. 1988. pp. 1-22.

Dassault Falcon 900EX Easy Systems Summary. Retrieved from: http://www.smartcockpit.com/docs/F900EX-Engines.pdf pp. 1-31.

Datasheet. CF6-80C2 high-bypass turbofan engines. Retreived from https://geaviation.com/sites/default/files/datasheet-CF6-80C2.pdf.

Datasheet. CFM56-5B For the Airbus A320ceo family and CFM56-7B for the Boeing 737 family. https://www.cfmaeroengines.com/.

Datasheet. Genx™ high bypass turbofan engines. Retreived from: https://www.geaviation.com/sites/default/files/datasheet-genx.pdf.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Davis, D.G.M. (1973). Variable-pitch fans: Progress in Britain. Flight International. Apr. 19, 1973. pp. 615-617.

Day, P.C. (1911). Herringbone gears. American Society of Mechanical Engineers: Transaction. vol. 33. 1912. pp. 681-715.

Day, P.C. (1912). Herringbone gears: The design and construction of double helical gears on the Wuest System. Industrial Engineering and the Engineering Digest. Jan. 1912. pp. 27-34.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Declaration of Dr. Magdy Attia, In re U.S. Appl. No. 8/313,280, Executed Oct. 21, 2016, pp. 1-88.

Pyrograf-III Carbon Nanofiber. Product guide. Retrieved Dec. 1, 2015 from: http://pyrografproducts.com/Merchant5/merchant.mvc?Screen=cp_nanofiber.

QCSEE ball spline pitch-change mechanism whirligig test report. (1978). NASA-CR-135354. Sep. 1, 1978. pp. 1-57.

QCSEE hamilton standard cam/harmonic drive variable pitch fan actuation system derail design report. (1976). NASA-CR-134852. Mar. 1, 1976. pp. 1-172.

QCSEE main reduction gears bearing development program final report. (1975). NASA-CR-134890. Dec. 1, 1975. pp. 1-41.

QCSEE over-the-wing final design report. (1977). NASA-CR-134848. Jun. 1, 1977. pp. 1-460.

QCSEE over-the-wing propulsion system test report vol. III—mechanical performance. (1978). NASA-CR-135325. Feb. 1, 1978. pp. 1-112.

QCSEE Preliminary analyses and design report. vol 1. (1974). NASA-CR-134838. Oct. 1, 1974. pp. 1-337.

QCSEE preliminary analyses and design report. vol. II. (1974). NASA-CR-134839. Oct. 1, 1974. pp. 340-630.

QCSEE the aerodynamic and mechanical design of the QCSEE under-the-wing fan. (1977). NASA-CR-135009. Mar. 1, 1977. pp. 1-137.

QCSEE the aerodynamic and preliminary mechanical design of the QCSEE OTW fan. (1975). NASA-CR-134841. Feb. 1, 1975. pp. 1-74.

QCSEE under-the-wing engine composite fan blade design. (1975). NASA-CR-134840. May 1, 1975. pp. 1-51.

QCSEE under-the-wing engine composite fan blade final design test report. (1977). NASA-CR-135046. Feb. 1, 1977. pp. 1-55.

QCSEE under-the-wing engine composite fan blade preliminary design test report. (1975). NASA-CR-134846. Sep. 1, 1975. pp. 1-56.

QCSEE under-the-wing engine digital control system design report. (1978). NASA-CR-134920. Jan. 1, 1978. pp. 1-309.

Quiet clean general aviation turbofan (QCGAT) technology study final report vol. I. (1975). NASA-CR-164222. Dec. 1, 1975. pp. 1-186.

Ramsden, J.M. (Ed). (1978). The new European airliner. Flight International, 113(3590). Jan. 7, 1978. pp. 39-43.

Ratna, D. (2009). Handbook of thermoset resins. Shawbury, UK: iSmithers. pp. 187-216.

Rauch, D. (1972). Design study of an air pump and integral lift engine ALF-504 using the Lycoming 502 core. Prepare for NASA. Jul. 1972. pp. 1-182.

Reshotko, M., Karchmer, A., Penko, P.F. and McArdle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

Riegler, C., and Bichlmaier, C. (2007). The geared turbofan technology—Opportunities, challenges and readiness status. Porceedings CEAS. Sep. 10-13, 2007. Berlin, Germany. pp. 1-12.

Rolls-Royce M45H. Jane's Aero-engines, Aero-engines—Turbofan. Feb. 24, 2010.

Rotordynamic instability problems in high-performance turbomachinery. (1986). NASA conference publication 2443. Jun. 2-4, 1986.

Roux, E. (2007). Turbofan and turbojet engines database handbook. Editions Elodie Roux. Blagnac: France. pp. 1-595.

Salemme, C.T. and Murphy, G.C. (1979). Metal spar/superhybrid shell composite fan blades. Prepared for NASA. NASA-CR-159594. Aug. 1979. pp. 1-127.

Sargisson, D.F. (1985). Advanced propfan engine technology (APET) and single-rotation gearbox/pitch change mechanism. NASA Contractor Report-168113. R83AEB592. Jun. 1, 1985. pp. 1-476.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.

Seader, J.D. and Henley, E.J. (1998). Separation process principles. New York, NY: John Wiley & Sons, Inc. pp. 722-726 and 764-771.

Shah, D.M. (1992). MoSi2 and other silicides as high temperature structural materials. Superalloys 1992. The Minerals, Metals, & Materials Society. pp. 409-422.

Shorter Oxford English Dictionary, 6th Edition. (2007), vol. 2, N-Z, pp. 1888.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Singh, A. (2005). Application of a system level model to study the planetary load sharing behavior. Jounal of Mechanical Design. vol. 127. May 2005. pp. 469-476.

Singh, B. (1986). Small engine component technology (SECT) study. NASA CR-175079. Mar. 1, 1986. pp. 1-102.

Singh, R. and Houser, D.R. (1990). Non-linear dynamic analysis of geared systems. NASA-CR-180495. Feb. 1, 1990. pp. 1-263.

Smith, C.E., Hirschkron, R., and Warren, R.E. (1981). Propulsion system study for small transport aircraft technology (STAT). Final report. NASA-CR-165330. May 1, 1981. pp. 1-216.

Smith-Boyd, L. and Pike, J. (1986). Expansion of epicyclic gear dynamic analysis program. Prepared for NASA. NASA CR-179563. Aug. 1986. pp. 1-98.

Sowers, H.D. and Coward, W.E. (1978). QCSEE over-the-wing (OTW) engine acuostic design. NASA-CR-135268. Jun. 1, 1978. pp. 1-52.

Spadaccini, L.J., and Huang, H. (2002). On-line fuel deoxygenation for coke suppression. ASME, Jun. 2002. pp. 1-7.

Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.

(56) References Cited

OTHER PUBLICATIONS

Steczynski M.E., "Machine Design," International Textbook Company, Book III, Parts 5-6, Scranton, PA, sections 65-66.
Submissions in the Opposition of European Patent Application No. 2809970 (13778366.8) by Safran Aircraft Engines mailed Nov. 28, 2022. [with English translation].
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Supplementary European Search Report for Application No. EP13778366.8 dated Oct. 1, 2015, 9 pages.
Butliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Interlocutory decision in opposition proceedings for European Patent Application No. 13778366.8 (2809970) dated Apr. 6, 2023.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
Thomas, J. and Houser, D. (1992). A procedure for predicting the load distribution and transmission error characteristics of double helical gears. 3rd World Congress on Gearing and Power Transmissions. Feb. 1992. pp. 90-98.
Thulin, R.D., Howe, D.C., and Singer, I.D. (1982). Energy efficient engine: High pressure turbine detailed design report. Prepared for NASA. NASA CR-165608. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Townsend D.P., "Dudley's gear handbook," Second Edition, New York, NY, McGraw-Hill, Inc, 1962.
Townsend D.P., "Gear Types and Nomenclature", Dudley's Gear Handbook, Second Edition, 1991, p. 2.7.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines—Turbofan. Nov. 2, 2009.

Turner, M. G., Norris, A., and Veres, J.P. (2004). High-fidelity three-dimensional simulation of the GE90. NASA/TM-2004-212981. pp. 1-18.
Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF 502: plugging the turbofan gap. Flight International, p. 237-241, Jan. 30, 1982.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Wikipedia. Stiffness. Retrieved Jun. 28, 2018 from: https://en.wikipedia.org/wiki/Stiffness.
Wikipedia. Torsion spring. Retreived Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Xie, M. (2008). Intelligent engine systems: Smart case system. NASA/CR-2008-215233. pp. 1-31.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air. 2009, Orlando, Florida. pp. 145-153.
Langston, L. and Faghri, A. Heat pipe turbine vane cooling. Prepared for Advanced Turbine Systems Annual Program Review. Morgantown, West Virginia. Oct. 17-19, 1995. pp. 3-9.

(56) References Cited

OTHER PUBLICATIONS

Lau, K., Gu, C., and Hui, D. (2005). A critical review on nanotube and nanotube/nanoclay related polymer composite materials. Composites: Part B 37(2006) 425-436.

Leckie, F.A. and Dal Bello, D.J. (2009). Strength and stiffness of engineering systems. Mechanical Engineering Series. Springer. pp. 1-10, 48-51.

Leckie F.A., et al., "Strength and Stiffness of Engineering Systems," Mechanical Engineering Series, Springer, 2009, pp. 1-3.

Lee, K.N. (2000). Current status of environmental barrier coatings for Si-Based ceramics. Surface and Coatings Technology 133-134, 2000. pp. 1-7.

Levintan, R.M. (1975). Q-Fan demonstrator engine. Journal of Aircraft. vol. 12( 8). Aug. 1975. pp. 658-663.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

Litt, J.S. (2018). Sixth NASA Glenn Research Center propulsion control and diagnostics (PCD) workshop. NASA/CP-2018-219891. Apr. 1, 2018. pp. 1-400.

Lord, W.K., Macmartin, D.G., and Tillman, T.G. (2000). Flow control opportunities in gas turbine engines. American Institute of Aeronautics and Astronautics. pp. 1-15.

Lynwander, P. (1983). Gear drive systems: Design and application. New York, New York: Marcel Dekker, Inc. pp. 145, 355-358.

Macisaac, B. and Langston, R. (2011). Gas turbine propulsion systems. Chichester, West Sussex: John Wiley & Sons, Ltd. pp. 260-265.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Manual. Student's Guide to Learning SolidWorks Software. Dassault Systemes—SolidWorks Corporation. pp. 1-156.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.

Mattingly, J.D. (1996). Elements of gas turbine propulsion. New York, New York: McGraw-Hill, Inc. pp. 8-15.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

Mcardle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Mccracken, R.C. (1979). Quiet short-haul research aircraft familiarization document. NASA-TM-81149. Nov. 1, 1979. pp. 1-76.

Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.

Mcmillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Meier N. (2005) Civil Turbojet/Turbofan Specifications. Retrieved from http://jet-engine.net/civtfspec.html.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.

Norton, M. and Karczub, D. (2003). Fundamentals of noise and vibration analysis for engineers. Press Syndicate of the University of Cambridge. New York: New York. p. 524.

Notice of Opposition for European Patent No. 2809970 (13778366.89) by Safran Aircraft Engines dated Sep. 16, 2021. [with English translation].

Oates, G.C. (Ed). (1989). Aircraft propulsion systems and technology and design. Washington, D.C.: American Institute of Aeronautics, Inc. pp. 341-344.

Parametric study of STOL short-haul transport engine cycles and operational techniques to minimize community noise impact. NASA-CR-114759. Jun. 1, 1974. pp. 1-397.

Parker, R.G. and Lin, J. (2001). Modeling, modal properties, and mesh stiffness variation instabilities of planetary gears. Prepared for NASA. NASA/CR-2001-210939. May 2001. pp. 1-111.

"Special Purpose Gear units for Petroleum, Chemical, and Gas Industry Services," API Standard 613, Fourth Edition, Jun. 1995, pp. 1-73.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Product Brochure. Garrett TFE731. Allied Signal. Copyright 1987. pp. 1-24.

(56) References Cited

OTHER PUBLICATIONS

Declaration of Dr. Magdy Attia, In re U.S. Appl. No. 8/517,668, Executed Dec. 8, 2016, pp. 1-81.
Declaration of John Eaton, Ph.D. In re U.S. Appl. No. 8/689,568, Executed Mar. 28, 2016, pp. 1-87.
Declaration of Reza Abhari, In re U.S. Appl. No. 8/448,895, Executed Nov. 28, 2016, pp. 1-81.
Declaration of Reza Abhari. In re U.S. Appl. No. 8/695,920, claims 1-4, 7-14, 17 and 19, Executed Nov. 29, 2016, pp. 1-102.
Declaration of Reza Abhari. In re U.S. Appl. No. 8/695,920. Executed Nov. 30, 2016, pp. 1-67.
Declaration of Reza Abhari, Ph.D. In re U.S. Appl. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-157.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Drago R.J., "Fundamentals of Gear Design," Stoneham, MA, Butterworth Publishers, 1988, pp. 22-23.
Drago R.J., "Helical Gears," In J. E. Shigley & C. R. Mischke (Eds.), Standard Handbook of Machine Design, New York, NY, McGraw-Hill, 1996, pp. 35.1-35.57.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
European Search Report for Application No. EP07253078.5 dated Nov. 22, 2007.
European Search Report for European Patent Application No. 20216432.3 completed Apr. 14, 2021.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Garret TFE731 Turbofan Engine (CAT C). Chapter 79: Lubrciation System. TTFE731 Issue 2. 2010. pp. 1-24.
Gates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group Limited. pp. 510-512.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., et al., "Analysis of turbofan design options for an advanced single-aisle transport aircraft", American Institute of Aeronautics and Astronautics, 2009, pp. 1-13.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor & Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.

\* cited by examiner

TURBINE ENGINE GEARBOX

CROSS REFERENCE TO RELATED APPLICATIONS

This application is a continuation of U.S. patent application Ser. No. 17/023,860, filed Sep. 17, 2020, which is a continuation of U.S. patent application Ser. No. 15/943,812, filed Apr. 3, 2018, which is a continuation of U.S. patent application Ser. No. 14/940,632, filed Nov. 13, 2015, which is a continuation of U.S. patent application Ser. No. 14/470,982, filed Aug. 28, 2014, which is a continuation of U.S. patent application Ser. No. 14/174,878, filed Feb. 7, 2014, which is a continuation-in-part of U.S. patent application Ser. No. 13/438,245, filed on Apr. 3, 2012, which claims priority to U.S. Provisional Application No. 61/592,964, filed on Jan. 31, 2012.

BACKGROUND

This disclosure relates generally to a turbine engine, and more specifically to a gearbox for a gas turbine engine.

A turbine engines includes a fan driven by a turbine. A gearbox is coupled between the fan to the turbine. The gearbox provides a speed decrease between the turbine and the fan.

SUMMARY

In a featured embodiment, a gas turbine engine has a fan, a compressor and a combustor, and a fan drive turbine rotor to drive the fan through a gear reduction. The gear reduction includes at least two double helical gears in meshed engagement, each of the at least two double helical gears disposed to rotate about respective axes, and each of the at least two double helical gears having a first plurality of gear teeth axially spaced from a second plurality of gear teeth by a spacer. Each of the first plurality of gear teeth has a first end facing the spacer and each of the second plurality of gear teeth has a first end facing the spacer. Each first end of the first plurality of gear teeth is circumferentially offset from each first end of the second plurality of gear teeth. A gear ratio of the gear reduction is greater than about 2.3:1.

In another embodiment according to the previous embodiment, the fan drive turbine drives a compressor rotor of the compressor, along with the fan through the gear reduction.

In another embodiment according to any of the previous embodiments, the gear reduction includes an epicyclic gear system.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another embodiment according to any of the previous embodiments, the gear ratio of the gear reduction is greater than or equal to about 2.5:1.

In another embodiment according to any of the previous embodiments, there are two additional turbine rotors, with one of the two additional turbine rotors driving a low pressure compressor rotor, and a second of the additional turbine rotors driving a high pressure compressor rotor.

In another embodiment according to any of the previous embodiments, the gear reduction includes an epicyclic gear system.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another featured embodiment, a method of designing a gas turbine engine includes providing a fan, a compressor and a combustor, and providing a fan drive turbine rotor to drive the fan through a gear reduction. The gear reduction includes at least two double helical gears in meshed engagement. Each of the at least two double helical gears are disposed to rotate about respective axes. Each of the at least two double helical gears have a first plurality of gear teeth axially spaced from a second plurality of gear teeth by a spacer. Each of the first plurality of gear teeth has a first end facing the spacer and each of the second plurality of gear teeth has a first end facing the spacer. Each first end of the first plurality of gear teeth is circumferentially offset from each first end of the second plurality of gear teeth. A gear ratio of the gear reduction is greater than about 2.3:1.

In another embodiment according to the previous embodiment, the fan drive turbine drives a compressor rotor, along with the fan through the gear reduction.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another embodiment according to any of the previous embodiments, the gearbox includes an epicyclic gear system.

In another embodiment according to any of the previous embodiments, the gear reduction is an epicyclic gear system that includes a sun gear, a ring gear, and a plurality of intermediate gears that engage the sun gear and ring gear.

In another embodiment according to any of the previous embodiments, the at least two helical gears are part of the plurality of intermediate gears.

In another embodiment according to any of the previous embodiments, the gear ratio of the gear reduction is greater than or equal to about 2.5:1.

In another embodiment according to any of the previous embodiments, there are two additional turbine rotors, with one of the two additional turbine rotors driving a low pressure compressor rotor, and a second of the additional turbine rotors driving a high pressure compressor rotor.

These and other features can be best understood from the following specification and drawings, the following of which is a brief description.

DETAILED DESCRIPTION

Figure 1:
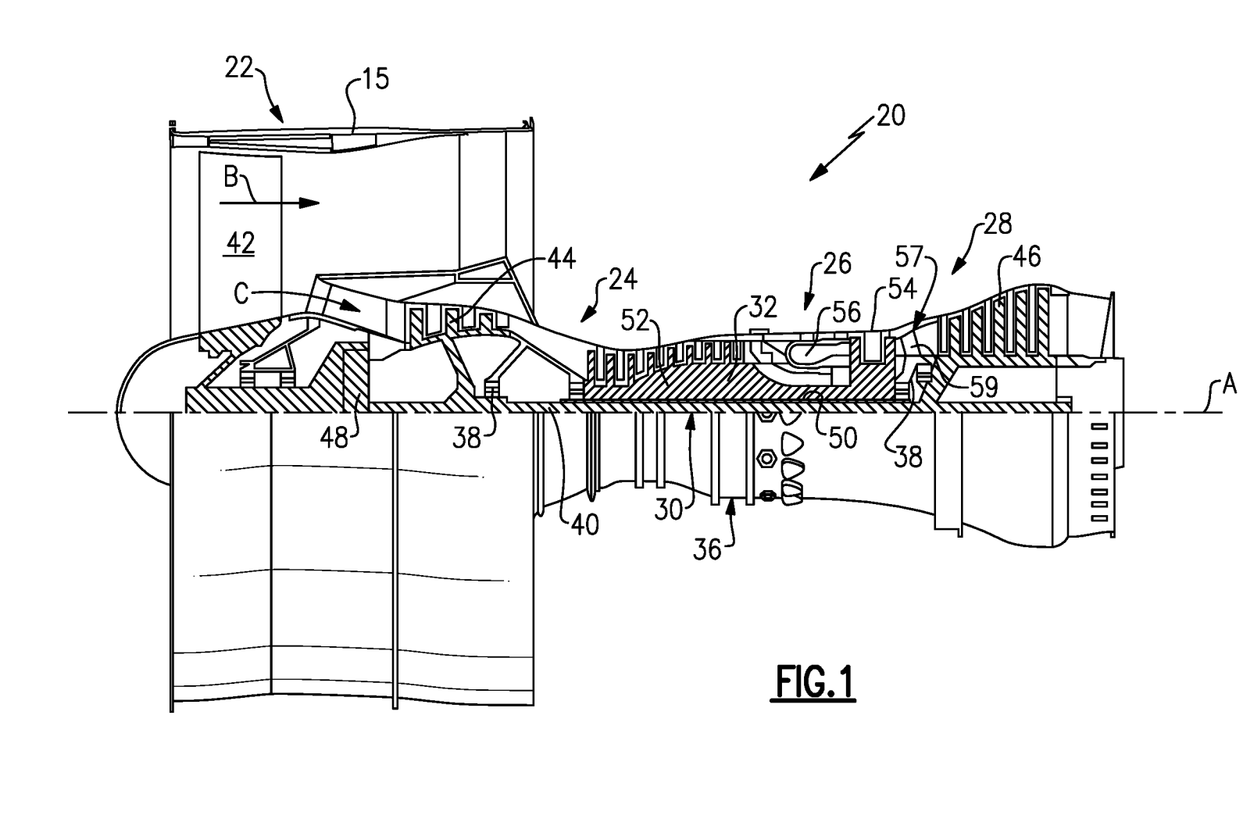
FIG. 1 is a cross-sectional view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a star system, a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{R})/(518.7° \text{R})]^{0.5}$. The "Low corrected fan tip speed" as disclosed herein according to one non-limiting embodiment is less than about 1150 ft/second.

As can be appreciated, the low pressure turbine 46 is a fan drive turbine, as it drives the fan rotor 42. In the disclosed two-spool embodiment, the turbine 46 also drives a lower pressure compressor 44.

Figure 2:
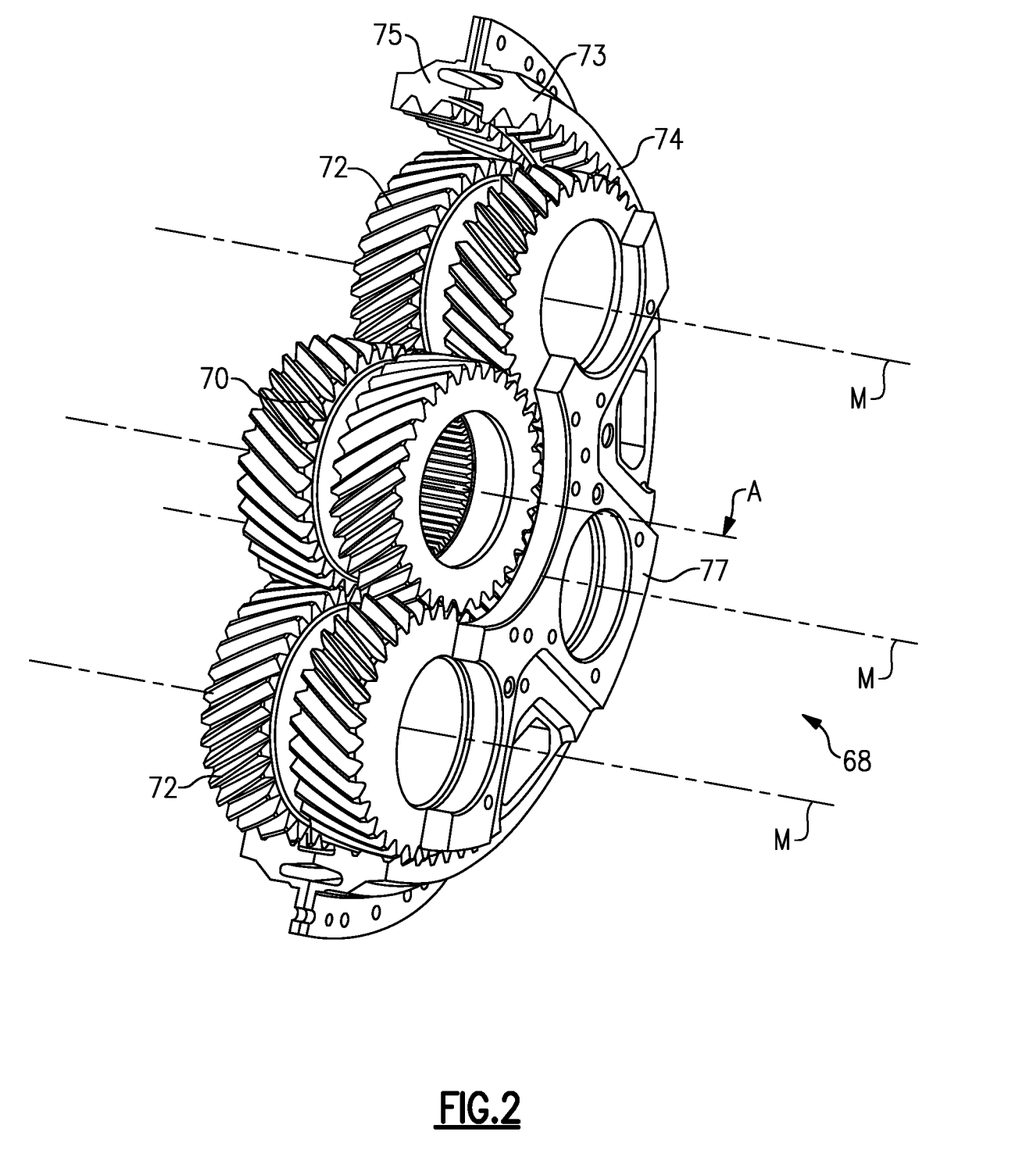
FIG. 2 is a perspective view of example gearbox.

FIG. 2 shows an example of the gearbox 48 as the epicyclical gear system 68 driven by the low speed spool 30. The epicyclical gear system 68 includes a sun gear 70, star gears 72, a ring gear 74, and a carrier 77. The sun gear 70 engages the star gears 72 and each star gear 72 engages the ring gear 74. In this example, each of the sun gear 70, star gears 72, and ring gear 74 are double helical gears, as will be described in further detail below.

Rotary motion of sun gear 70 urges each star gear 72 arranged about the sun gear 70 to rotate about their own respective axis M. The star gears 72 mesh with both the rotating ring gear 74 and rotating sun gear 70. The star gears 72 rotate about their respective axis M to drive the ring gear 74 to rotate about engine axis A. The rotation of the ring gear 74 drives the fan 42 (FIG. 1) at a lower speed than the low spool 30. The ring gear 74 is a split assembly and includes a first section 73 and a second section 75 that are urged together by the star gears 72.

In one example, the sun gear 70, star gears 72, and ring gear 74 have a transverse contact ratio greater than two (2) such that at least two gear teeth of each gear 70, 72, 74 engage at least two gear teeth of another gear 70, 72, 74 during operation.

The gearbox 48 is subject to variations in torque transfer due to geometry and manufacturing tolerances. These variations cause vibrations in the gearbox 48, which are imparted on other associated turbine engine components. The resultant vibration affects durability of gearbox 48 components, and associated turbine engine components, thus affecting the life of the gearbox 48 and gas turbine engine 20 components.

Figure 3:
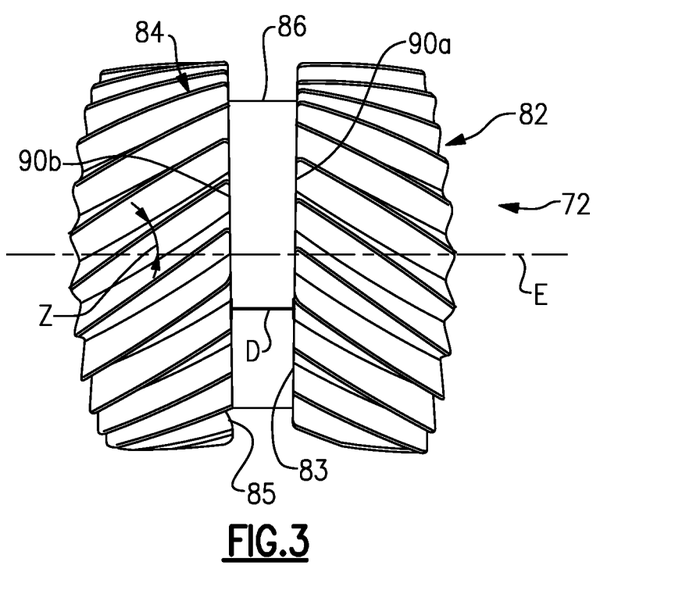
FIG. 3 is a perspective view of an example double helical gear.
Figure 4:
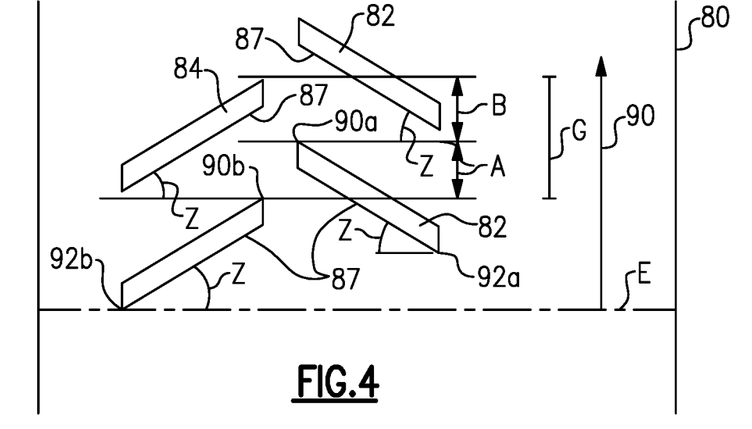
FIG. 4 is a top schematic view of teeth of the example double helical gear of FIG. 3.

FIGS. 3 and 4 shows an example of one of the star gears 72 as a double helical gear. It is to be understood that the described examples herein are also applicable to the sun gear 70, and ring gear 74, as well as other gears or gear systems of the gas turbine engine 20.

The star gear 72 includes a first plurality of gear teeth 82 disposed on a first base 83 opposite a second plurality of gear teeth 84 disposed on a second base 85 along axis E. The first plurality of gear teeth 82 and the second plurality of gear teeth 84 are separated by a non-toothed ring 86 disposed about axis E such that a first end 90a of the first plurality of gear teeth 82 and a first end 90b of the second plurality of gear teeth 84 are spaced apart an axial distance D equal to the width of the ring 86. The first plurality of gear teeth 82 and the second plurality of gear teeth 84 are rotatable around axis E.

In one example, the axial distance D of the width of non-toothed ring 86 is between 16% and 24% of the total axial length of the gear. In a further example, the first plurality of gear teeth 82 and the second plurality of gear teeth 84 each have an equal helix angle Z. In a further example, each of the first plurality of gear teeth 82 and the second plurality of gear teeth 84 have the same helix angle Z such that no axial thrust load is generated along axis E.

In another example, helix angle Z of the first plurality of gear teeth 82 is different than the helix angle Z of the second plurality of gear teeth 84, to generate a pre-determined thrust load along axis E in the gas turbine engine 20.

Each of the second plurality of gear teeth 84 includes the first end 90b and a second end 92b. Similarly, each of the first plurality of gear teeth includes the first end 90a and a second end 92a. In one example, the second plurality of gear teeth 84 is offset a circumferential offset distance A in relation to the next gear tooth 82 of the first plurality of gear teeth 82 when moving in circumferential direction of arrow 90. The first end 90a of each of the first plurality of gear teeth 82 is similarly spaced a circumferential offset distance B apart from the first end 90b of the next corresponding gear tooth 84 of the second plurality of gear teeth 84 when moving in direction of arrow 90. Circumferential offset distance G is a total of the circumferential offset distance A and the circumferential offset distance B between adjacent teeth of the second plurality of gear teeth 84 or first plurality of gear teeth 82.

Each of the first plurality of gear teeth 82 and second plurality of gear teeth 84 are arranged at the helix angle Z between axis E and a circumferential surface 87 each of the first plurality of gear teeth 82 and the second plurality of gear teeth 84. In this example, each of the first plurality of gear teeth 82 and the second plurality of gear teeth 84 are arranged at an equivalent helix angle Z relative to axis E.

In one example, the helix angle Z is between 30 and 35 degrees. In a further example, the helix angle Z is 33 degrees. The given helix angle Z or range urges the first section 73 and second section 75 of the ring gear 74 together.

The selected helix angle Z also influences the dynamics of the gearbox 48. As the helix angle Z increases from 0, a greater number of gear teeth 82, 84 engage teeth 82, 84 of a mating sun gear 70 and ring gear 74 (See FIG. 2). Selecting the first plurality of gear teeth 82 and second plurality of gear teeth 84 with the disclosed helix angle Z provides additional contact, and higher torque transfer, while maintaining the size of star gear 72.

Circumferential offset distance A and circumferential offset distance B are determined and used to offset each of the first plurality of gear teeth 82 from the next corresponding tooth 84 of the second plurality of gear teeth 84 between 0% and 100% of the circumferential offset distance G between each of the respective first plurality of gear teeth 82 or second plurality of gear teeth 84. In another example, the first plurality of gear teeth 82 are between about 25% to 75% offset from the second plurality of gear teeth 84 such that the ratio of circumferential offset distance A to circumferential offset distance G is between about 0.25 and 0.75. In a further example, the first plurality of gear teeth 82 are 50% offset from the second plurality of gear teeth 84, such that circumferential offset distance A and circumferential offset distance B are equal.

In another example, the circumferential offset distance A is selected in response to a gear characteristic of the star gear 72. The gear characteristic is at least one of harmonic level, transmission error, and vibration level through the star gear 72.

Figure 5A:
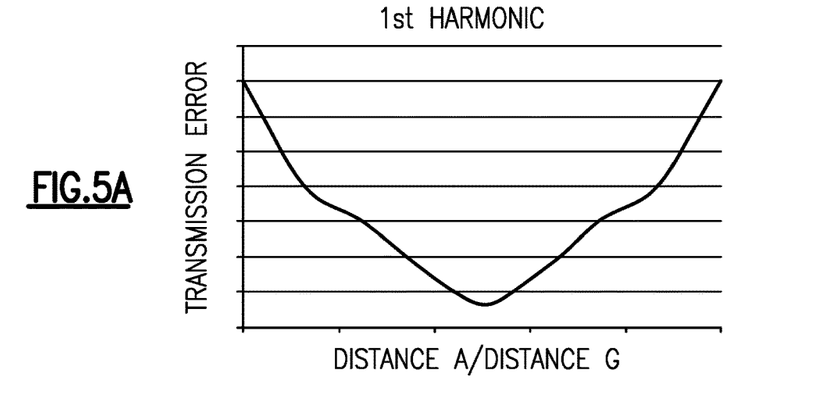
FIGS. 5A-5C are graphs illustrating example transmission error and gear teeth offsetting of the example double helical gear of FIG. 3.
Figure 5B:
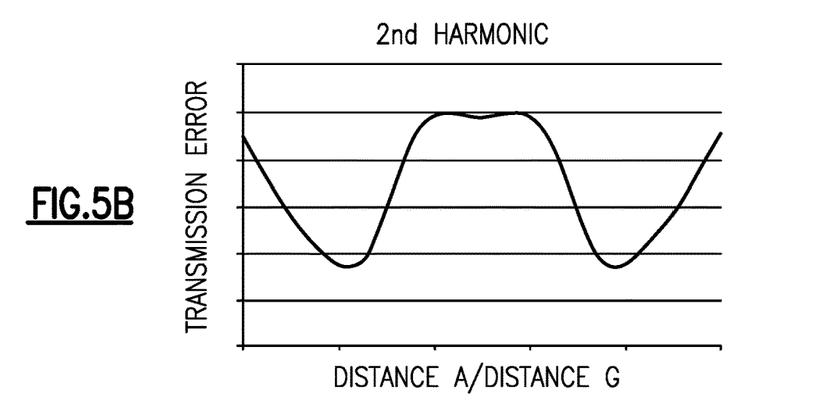
Figure 5C:
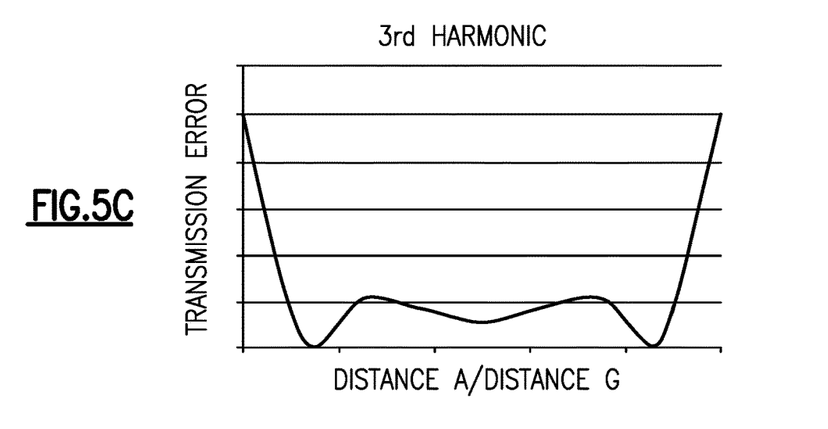

FIGS. 5A-5C show the circumferential offset distance A is pre-determined to provide a percent offset (axis X) in response to a frequency of the star gear 72 during meshing of star gears 72 in the gearbox 48. The percent offset results in a change in transmission error to effect the chosen frequency. Performance of the star gear 72 is controlled in response to the frequency based on the selected percent offset to reduce or minimize the amount of transmission error and vibration.

The frequency represents a harmonic level. In this example, a first harmonic has a frequency equal to the number of teeth on the sun gear times the revolutions per second of the sun gear relative to the carrier 77, a second harmonic has a frequency of 2 times the first harmonic, and a third harmonic has a frequency of 3 times the first harmonic. For each of the first harmonic, second harmonic, and third harmonic, transmission error is controlled by selecting a pre-determined percent offset between the first plurality of gear teeth 82 and second plurality of gear teeth 84, as equates to circumferential offset distance A and circumferential offset distance B. Transmission error is defined herein as the deviation between the circumferential position that the star gear 72 should have and the actual position during meshing.

In one example, as shown in FIG. 5A, the first plurality of gear teeth 82 are between about 25% to 75% offset from the second plurality of gear teeth 84 such that a ratio of circumferential offset distance A to circumferential offset distance G is between about 0.25 and 0.75 to reduce transmission error in the first harmonic.

In a further example, as shown in FIG. 5B, the first plurality of gear teeth 82 are between about 15% to 25% or 75% to 85% offset from the second plurality of gear teeth 84 such that a ratio of circumferential offset distance A to circumferential offset distance G is between about 0.15 and 0.25 or between about 0.75 and 0.85 to reduce transmission error in the second harmonic.

In a further example, as shown in FIG. 5C, the first plurality of gear teeth 82 are between about 15% to 85% offset from the second plurality of gear teeth 84 such that a ratio of circumferential offset distance A to circumferential offset distance G is between about 0.15 and 0.85 to reduce transmission error in the third harmonic.

In a further embodiment, the first plurality of gear teeth 82 are offset about 50% from the second plurality of gear teeth 84 such that a ratio of circumferential offset distance A to circumferential offset distance G is about 0.5 to reduce transmission error in the first harmonic and the third harmonic.

Offsetting the first plurality of gear teeth 82 and the second plurality of gear teeth 84 the circumferential offset distance A or circumferential offset distance B reduces the overall transmission error of the gearbox 48. Circumferential offset distance A and circumferential offset distance B are determined depending on the harmonic level(s) of the star gears 72 during meshing. Performance of the gearbox 48, which is controlled by reduction in transmission error, reduces vibration in the gearbox 48 and gas turbine engine 20 during operation. Thus, torque transfer is smoother, with less overall effect on engine component life and efficiency due to vibration.

Figure 6:
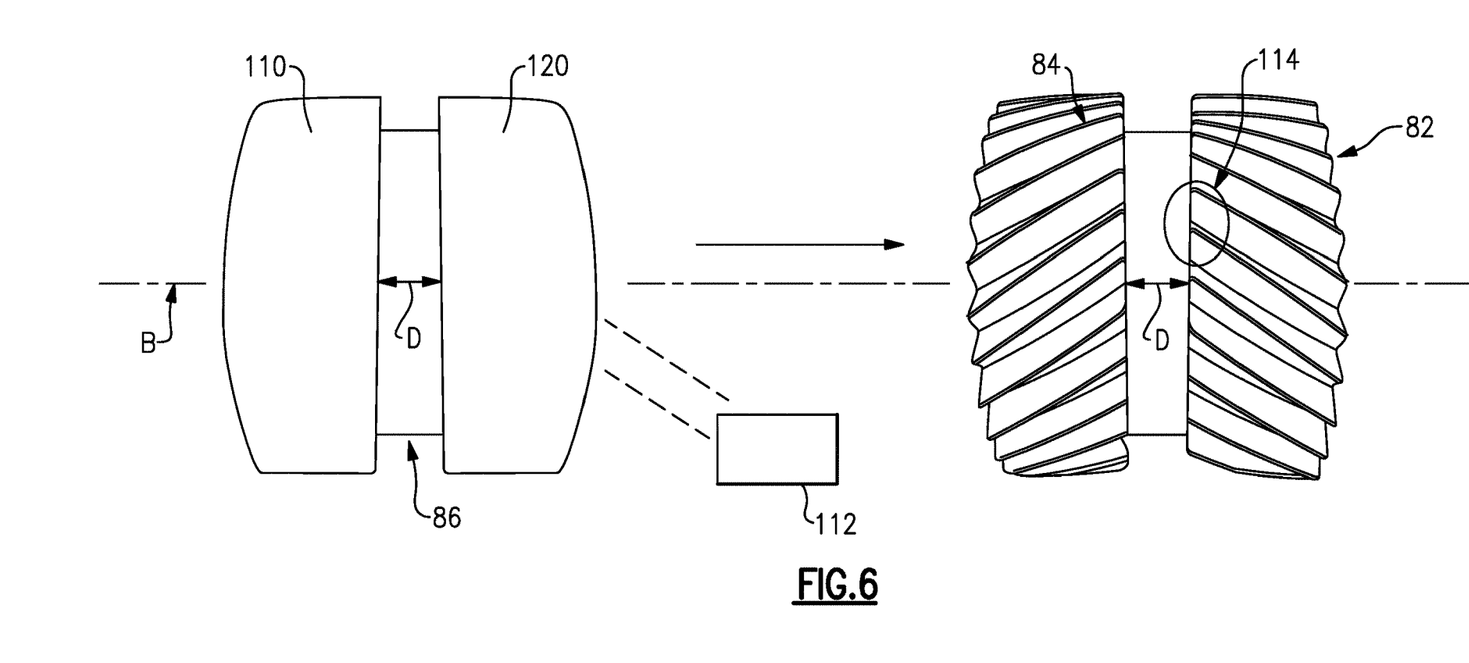
FIG. 6 is a perspective view of the steps of forming the example double helical gear of FIG. 3.

Referring to FIG. 6, an example method of forming the star gear 72 is shown. A first cylinder 110 and second cylinder 120 are arranged on either axial side of ring 86 along axis E. A tool 112 (shown schematically) is provided and machines grooves in the first cylinder 110 and the second cylinder 120 to form the first plurality of gear teeth 82 and second plurality of gear teeth 84. The first plurality of gear teeth 82 and second plurality of gear teeth 84 are arranged at an helix angle Z and offset an circumferential offset distance A and circumferential offset distance B, as described above. After one of the first plurality of gear teeth 82 and second plurality of gear teeth 84 are formed, the tool 112 is used to form the remaining plurality of gear teeth 82, 84 without affecting the dimensions of the already formed first plurality of gear teeth 82 or second plurality of gear teeth 84. As shown in FIG. 6, the star gear 72 is a one-piece gear formed from the first and second cylinders 110, 120, with the portions of the star gear 72 defining the gear teeth 82, 84 fixed to each other by the ring 86. The space between first cylinder 110 and second cylinder 120 provided by ring 86 allows the tool 112 to form the plurality of gear teeth 82, 84 without affecting the already formed plurality of gear teeth 82, 84. By offsetting the first plurality of gear teeth 82 and second plurality of gear teeth 84, the tool 112 is able to move into the space 114 between the already formed plurality of gear teeth 82, 84, thus reducing the width D of ring 86 needed to form the unformed plurality of gear teeth 82, 84. The reduction of width D decreases the weight of the star gear 72.

Although the example first cylinder 110 and second cylinder 120 are shown, it is within the contemplation of this disclosure to use other geometrical sections to form the star gear 72 based on gas turbine engine 20 specifications. In one example, the tool 112 is a grinding wheel.

Figure 7:
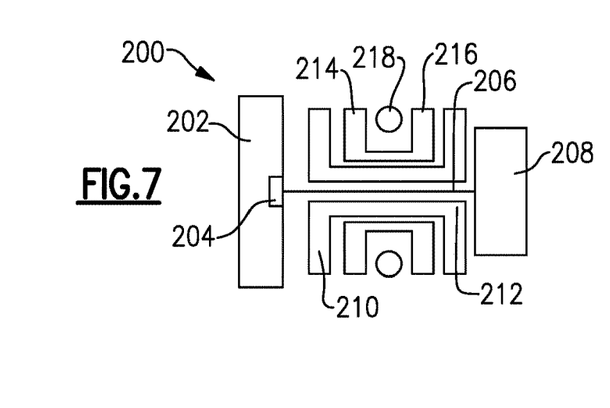
FIG. 7 shows an alternative embodiment.

FIG. 7 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured, mounted and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine rotor 216.

Figure 8:
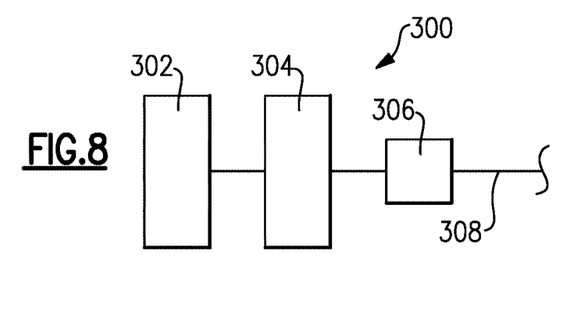
FIG. 8 shows another alternative embodiment.

FIG. 8 shows yet another embodiment 300 wherein a fan rotor 302 and a first stage compressor 304 rotate at a common speed. The gear reduction 306 (which may be structured, mounted and operated as disclosed above) is intermediate the compressor rotor 304 and a shaft 308 which is driven by a low pressure turbine section.

Although a preferred embodiment has been disclosed, a worker of ordinary skill in this art would recognize that certain modifications would come within the scope of this disclosure. For that reason, the following claims should be studied to determine the true scope and content of this disclosure.

What is claimed is:

1. A gas turbine engine comprising:
   a propulsor section including a propulsor;
   a gear reduction;
   a first spool including a first compressor, a first turbine and a first shaft, wherein the first shaft interconnects the first compressor and the first turbine, each of the first compressor and a second compressor includes a plurality of stages, and the first turbine drives the propulsor through the gear reduction;
   a second spool including the second compressor, a second turbine and a second shaft, wherein the second shaft interconnects the second compressor and the second turbine;
   wherein the gear reduction is an epicyclic gear system that includes a carrier and a plurality of gears, and the plurality of gears including a sun gear, a ring gear, and a plurality of intermediate gears that engage the sun gear and the ring gear;
   wherein at least two of the plurality of gears are double helical gears in meshed engagement, each of the double helical gears disposed to rotate about respective axes, each of the double helical gears having a first plurality of gear teeth separated from a second plurality of gear teeth such that a first end of the first plurality of gear teeth and a first end of the second plurality of gear teeth are spaced apart by an axial distance;
   wherein each of the first plurality of gear teeth is offset a first circumferential offset distance in relation to a next gear tooth of the second plurality of gear teeth when moving in a circumferential direction relative to the respective axes, each of the second plurality of gear teeth is offset a second circumferential offset distance in relation to a next gear tooth of the first plurality of gear teeth when moving in the circumferential direction, a third circumferential offset distance being a total of the first circumferential offset distance and the second circumferential offset distance, and a ratio of the first circumferential offset distance and the third circumferential offset distance is between 0.25 and 0.75; and
   wherein each gear tooth of the first plurality of gear teeth and the second plurality of gear teeth is disposed at a respective helix angle relative to the respective axes, and the helix angle of the first plurality of gear teeth is different from the helix angle of the second plurality of gear teeth.

2. The gas turbine engine as set forth in claim 1, wherein a gear reduction ratio of the gear reduction is greater than 2.3:1.

3. The gas turbine engine as set forth in claim 2, wherein:
   each of the plurality of intermediate gears is one of the double helical gears.

4. The gas turbine engine as set forth in claim 3, wherein:
   the sun gear, the intermediate gears and the ring gear have a transverse contact ratio of greater than 2 such that at least two gear teeth of each of the sun gear, the intermediate gears and the ring gear engage at least two gear teeth of another one of the sun gear, the intermediate gears and the ring gear.

5. The gas turbine engine as set forth in claim 4, wherein the helix angle is between 30 degrees and 35 degrees.

6. The gas turbine engine as set forth in claim 4, wherein:
the first plurality of gear teeth and the second plurality of gear teeth are separated by a spacer disposed about the respective axis; and
the spacer is dimensioned such that the axial distance is equal to between 16% and 24% of a total axial length of a respective one of the double helical gears relative to the respective axis.

7. The gas turbine engine as recited in claim 6, wherein:
each of the sun gear, the plurality of intermediate gears, and the ring gear is a respective one of the double helical gears; and
the first circumferential offset distance is selected in response to a gear characteristic, and the gear characteristic includes at least one of a first harmonic level, a second harmonic level and a third harmonic level.

8. The gas turbine engine as set forth in claim 6, wherein the ring gear is a split assembly that includes a first section and a second section that are urged together by the plurality of intermediate gears in response to rotation of the plurality of intermediate gears.

9. The gas turbine engine as set forth in claim 3, wherein the gear reduction ratio is greater than 2.5:1.

10. The gas turbine engine as set forth in claim 9, wherein the propulsor is a fan, and an outer housing surrounds the fan to define a bypass duct.

11. The gas turbine engine as set forth in claim 10, further comprising:
a bypass ratio of greater than 10:1; and
wherein the fan has a fan pressure ratio of less than 1.45 across a fan blade alone at cruise at 0.8 Mach and 35,000 feet.

12. The gas turbine engine as set forth in claim 11, wherein the ring gear is a split assembly that includes a first section and a second section that are urged together by the plurality of intermediate gears in response to rotation of the plurality of intermediate gears.

13. The gas turbine engine as set forth in claim 11, wherein:
the sun gear, the intermediate gears and the ring gear have a transverse contact ratio of greater than 2 such that at least two gear teeth of each of the sun gear, the intermediate gears and the ring gear engage at least two gear teeth of another one of the sun gear, the intermediate gears and the ring gear.

14. The gas turbine engine as set forth in claim 13, wherein the first plurality of gear teeth and the second plurality of gear teeth are separated by a spacer disposed about the respective axis.

15. The gas turbine engine as set forth in claim 14, wherein:
the spacer is dimensioned such that the axial distance is equal to between 16% and 24% of a total axial length of a respective one of the double helical gears relative to the respective axis; and
the first circumferential offset distance is selected in response to a gear characteristic, and the gear characteristic includes at least one of a first harmonic level, a second harmonic level and a third harmonic level.

16. The gas turbine engine as set forth in claim 14, wherein the gear reduction is a star system, and rotation of the ring gear drives the fan at a lower speed than an input to the gear reduction.

17. The gas turbine engine as set forth in claim 16, wherein the ring gear is a split assembly that includes a first section and a second section that are urged together by the plurality of intermediate gears in response to rotation of the plurality of intermediate gears.

18. The gas turbine engine as set forth in claim 17, wherein the axial distance is equal to a width of the spacer, and the axial distance is equal to between 16% and 24% of a total axial length of a respective one of the double helical gears relative to the respective axis.

19. The gas turbine engine as recited in claim 18, further comprising a low corrected fan tip speed of less than 1150 feet/second, and wherein:
each of the sun gear, the plurality of intermediate gears, and the ring gear is a respective one of the double helical gears;
the helix angle is between 30 degrees and 35 degrees;
the second turbine includes two stages, the first turbine includes a greater number of stages than the second turbine, and the first compressor includes three stages; and
the first turbine includes an inlet, an outlet and a pressure ratio of greater than 5, the pressure ratio being pressure measured prior to the inlet as related to pressure at the outlet prior to an exhaust nozzle.

20. The gas turbine engine as set forth in claim 14, wherein the gear reduction is a planetary system.

21. The gas turbine engine as set forth in claim 20, wherein the ring gear is a split assembly that includes a first section and a second section that are urged together by the plurality of intermediate gears in response to rotation of the plurality of intermediate gears.

22. The gas turbine engine as set forth in claim 21, wherein the axial distance is equal to a width of the spacer, and the axial distance is equal to between 16% and 24% of a total axial length of a respective one of the double helical gears relative to the respective axis.

23. The gas turbine engine as recited in claim 22, further comprising a low corrected fan tip speed of less than 1150 feet/second, and wherein:
each of the sun gear, the plurality of intermediate gears, and the ring gear is a respective one of the double helical gears;
the helix angle is between 30 degrees and 35 degrees;
the second turbine includes two stages, the first turbine includes a greater number of stages than the second turbine, and the first compressor includes three stages; and
the first turbine includes an inlet, an outlet and a pressure ratio of greater than 5, the pressure ratio being pressure measured prior to the inlet as related to pressure at the outlet prior to an exhaust nozzle.

24. A gas turbine engine comprising:
a propulsor section including a propulsor;
a gear reduction;
a first spool including a first compressor, a first turbine and a first shaft, wherein the first shaft interconnects the first compressor and the first turbine, each of the first compressor and a second compressor includes a plurality of stages, and the first turbine drives the propulsor through the gear reduction;
a second spool including the second compressor, a second turbine and a second shaft, wherein the second shaft interconnects the second compressor and the second turbine;
wherein the gear reduction is an epicyclic gear system that includes a carrier and a plurality of gears, and the plurality of gears including a sun gear, a ring gear, and a plurality of intermediate gears that engage the sun gear and the ring gear;

wherein at least two of the plurality of gears are double helical gears in meshed engagement, each of the double helical gears disposed to rotate about respective axes, each of the double helical gears is a one-piece gear having a first plurality of gear teeth separated from a second plurality of gear teeth such that a first end of the first plurality of gear teeth and a first end of the second plurality of gear teeth are spaced apart by an axial distance;

wherein each of the first plurality of gear teeth is offset a first circumferential offset distance in relation to a next gear tooth of the second plurality of gear teeth when moving in a circumferential direction relative to the respective axes, each of the second plurality of gear teeth is offset a second circumferential offset distance in relation to a next gear tooth of the first plurality of gear teeth when moving in the circumferential direction, a third circumferential offset distance being a total of the first circumferential offset distance and the second circumferential offset distance, and a ratio of the first circumferential offset distance and the third circumferential offset distance is between 0.25 and 0.75;

wherein each of the plurality of intermediate gears is a respective one of the double helical gears; and wherein the first plurality of gear teeth and the second plurality of gear teeth are disposed at a helix angle relative to the respective axes, and the helix angle is between 30 degrees and 35 degrees.

25. The gas turbine engine as set forth in claim 24, wherein:

the sun gear, the intermediate gears and the ring gear have a transverse contact ratio of greater than 2 such that at least two gear teeth of each of the sun gear, the intermediate gears and the ring gear engage at least two gear teeth of another one of the sun gear, the intermediate gears and the ring gear.

26. The gas turbine engine as set forth in claim 25, wherein:

the first plurality of gear teeth and the second plurality of gear teeth are separated by a spacer disposed about the respective axis; and the spacer is dimensioned such that the axial distance is equal to between 16% and 24% of a total axial length of a respective one of the double helical gears relative to the respective axis.

27. The gas turbine engine as set forth in claim 26, wherein:

the propulsor is a fan, and an outer housing surrounds the fan to define a bypass duct; and the fan has a fan pressure ratio of less than 1.45 across a fan blade alone at cruise at 0.8 Mach and 35,000 feet, and further comprising a bypass ratio of greater than 10:1.

28. The gas turbine engine as set forth in claim 27, wherein:

the helix angle of the first plurality of gear teeth is the same as the helix angle of the second plurality of gear teeth.

29. The gas turbine engine as set forth in claim 27, wherein:

the helix angle of the first plurality of gear teeth is different from the helix angle of the second plurality of gear teeth.

30. A gas turbine engine comprising:
a propulsor section including a propulsor;
a gear reduction;
a first spool including a first compressor, a first turbine and a first shaft, wherein the first shaft interconnects the first compressor and the first turbine, each of the first compressor and a second compressor includes a plurality of stages, and the first turbine drives the propulsor through the gear reduction;
a second spool including the second compressor, a second turbine and a second shaft, wherein the second shaft interconnects the second compressor and the second turbine;

wherein the gear reduction is an epicyclic gear system that includes a carrier and a plurality of gears, and the plurality of gears including a sun gear, a ring gear, and a plurality of intermediate gears that engage the sun gear and the ring gear;

wherein at least two of the plurality of gears are double helical gears in meshed engagement, each of the double helical gears disposed to rotate about respective axes, each of the double helical gears is a one-piece gear having a first plurality of gear teeth separated from a second plurality of gear teeth such that a first end of the first plurality of gear teeth and a first end of the second plurality of gear teeth are spaced apart by an axial distance;

wherein each of the first plurality of gear teeth is offset a first circumferential offset distance in relation to a next gear tooth of the second plurality of gear teeth when moving in a circumferential direction relative to the respective axes, each of the second plurality of gear teeth is offset a second circumferential offset distance in relation to a next gear tooth of the first plurality of gear teeth when moving in the circumferential direction, a third circumferential offset distance being a total of the first circumferential offset distance and the second circumferential offset distance, and a ratio of the first circumferential offset distance and the third circumferential offset distance is between 0.15 and 0.25, or is between 0.75 and 0.85; and wherein each of the plurality of intermediate gears is a respective one of the double helical gears.

31. The gas turbine engine as set forth in claim 30, wherein:

the propulsor is a fan, and an outer housing surrounds the fan to define a bypass duct;

the fan has a fan pressure ratio of less than 1.45 across a fan blade alone at cruise at 0.8 Mach and 35,000 feet, and further comprising a bypass ratio of greater than 10:1; and the first plurality of gear teeth and the second plurality of gear teeth are disposed at a helix angle relative to the respective axes, and the helix angle is between 30 degrees and 35 degrees.

32. The gas turbine engine as set forth in claim 31, wherein:

each gear tooth of the first plurality of gear teeth and the second plurality of gear teeth is disposed at a respective helix angle relative to the respective axes, and the helix angle of the first plurality of gear teeth is the same as the helix angle of the second plurality of gear teeth.

33. The gas turbine engine as set forth in claim 31, wherein:

each gear tooth of the first plurality of gear teeth and the second plurality of gear teeth is disposed at a respective helix angle relative to the respective axes, and the helix angle of the first plurality of gear teeth is different from the helix angle of the second plurality of gear teeth.

* * * * *